Dec. 4, 1962 J. F. SCHIRTZINGER 3,066,896
METHOD AND MEANS FOR DECELERATING AIRCRAFT ON RUNWAYS
Filed April 27, 1959 5 Sheets-Sheet 1

INVENTOR.
JOSEPH F. SCHIRTZINGER
BY
Paul A. Weilein
ATTORNEY.

Dec. 4, 1962  J. F. SCHIRTZINGER  3,066,896
METHOD AND MEANS FOR DECELERATING AIRCRAFT ON RUNWAYS
Filed April 27, 1959  5 Sheets-Sheet 4

INVENTOR.
JOSEPH F. SCHIRTZINGER
BY
Paul A. Weilein
ATTORNEY.

Dec. 4, 1962 J. F. SCHIRTZINGER 3,066,896
METHOD AND MEANS FOR DECELERATING AIRCRAFT ON RUNWAYS
Filed April 27, 1959 5 Sheets-Sheet 5

INVENTOR.
JOSEPH F. SCHIRTZINGER
BY
Paul A. Weilein
ATTORNEY.

United States Patent Office 3,066,896
Patented Dec. 4, 1962

3,066,896
METHOD AND MEANS FOR DECELERATING AIRCRAFT ON RUNWAYS
Joseph F. Schirtzinger, Pasadena, Calif., assignor to Air Logistics Corporation, Pasadena, Calif., a corporation of Delaware
Filed Apr. 27, 1959, Ser. No. 809,027
26 Claims. (Cl. 244—114)

This invention relates to a method and means for decelerating rolling aircraft in a manner which will prevent runway overrun and underrun accidents that may result in loss of life and serious damage to the aircraft and other valuable property.

It is known that a number of serious overrun and underrun runway accidents have occurred as a result of the use of runways which proved to be of inadequate length for the take-off and landing of aircraft of the high-speed types developed in recent years, particularly jet-propelled aircraft. Moreover, because of the possibility of overrunning a runway, pilots attempt landings as close as possible to the start of the runway, and this has been the cause of a number of underrun accidents wherein the aircraft failed to reach the beginning of the runway.

It is also known that runways of adequate length when dry and free from slippery surfaces, may prove of inadequate length and cause overrun accidents under wet, oily or icy conditions, as well as when covered with snow or other foreign matter that may interfere with the required deceleration and control of the aircraft. Moreover, failure of the brakes or one or more of the other control units provided on the aircraft for decelerating the speed thereof, is another factor which may also cause overrun accidents on take-off and landing of aircraft on a runway considered suitable when the brakes or other decelerating units are operable.

The number of overrun and underrun accidents has increased in recent year with the advent of jet-operated aircraft and, as there are now in process of development jet aircraft having greater weight and speed than the types presently in use, it is apparent that further serious overrun and underrun accidents are likely to occur unless proper remedial measures are provided.

The lengthening of existing runways and the construction of new runways of adequate length can be a solution to this problem, but in many cases the additional land required is not available and the cost of lengthening the runways with conventional hard-surfaced extensions or of constructing new hard-surfaced runways may be prohibitive in consideration of the fact that government regulations for jet aircraft specify runway lengths in excess of 10,000 feet, and in some cases as high as 14,000 feet or better. Very few runways available today have sufficient length or overrun area to make it possible to add to the runway at a reasonable cost, a hard-surfaced runway extension necessary to meet the regulation requirements. This economic factor may be a particular barrier to enlargement of runways and to the construction of new adequate runways by commercial airline companies and municipalities, especially as the larger and faster jet aircraft being developed and proposed obviously will require greatly increased runway lengths from time to time.

It is known that various mechanical devices have been developed and proposed for arresting the rolling speed of aircraft. In all known instances, these devices have constituted or propose the use of yieldable obstructions operable above the level of the runway to intercept the landing gear or some portion of the aircraft. However, these devices are not deemed safe for decelerating present-day jet aircraft and the heavier and faster types in the process of development, inasmuch as such aircraft upon encountering these devices are likely to be subjected to damaging loads resulting in increased risk of fire and other attendant hazards.

In consideration of the problems and hazards hereinbefore mentioned, it is an object of this invention to provide as an adjunct of a conventional hard-surface runway, a decelerating runway section arranged so that a pilot, after landing an aircraft on the conventional runway, or after starting the take-off run of an aircraft on the conventional runway, at his option, may steer the aircraft onto the decelerating section and bring it quickly to a safe stop if in the judgment of the pilot it appears that the aircraft, after so landing, may overrun the runway, as well as in case of failure of the aircraft to attain proper takeoff speed or for any other reason it appears that an attempt to abort the take-off may result in overrunning the runway.

It is also an object of this invention to provide a novel and efficient method of safely decelerating rolling aircraft during a much shorter run than heretofore possible, without subjecting the aircraft to loads or stresses that may be damaging.

It is a further object hereof to provide a decelerating runway such as described which has a high kinetic energy absorbing ability close to the maximum design drag load of the aircraft's landing gear assembly but which will provide optimum deceleration without damaging the aircraft or requiring use of reverse thrust, brakes, drag chutes, hooks, cables or other barriers.

It is another object of this invention to provide a novel aircraft decelerating runway unit which may be embodied in existing runways at a comparatively low cost, either as an extension thereof, for example up to approximately 1000 feet in length at the far end of the runway, if overrun ground of that length is available, or as a substitute construction replacing the far end portion of the existing runway, or as an extension adjoining one or both sides of the existing runway, and which in all cases, will be operable safely to decelerate an aircraft and bring it to a stop well within the runway limits.

It is an important object of this invention to provide a decelerating runway such as described which is at all times available for use at the discretion of the pilots, and after each use is automatically restored to condition for reuse.

Another object of this invention is the provision of a novel means whereby a runway of considerably less length than heretofore considered safe for jet-operated aircraft and other fast and heavy aircraft and having inadequate overrun area, may be rendered safe for the take-off and landing of such aircraft at a much lower cost than required for adding thereto a conventional runway extension of requisite length.

Another object of this invention is to provide a novel aircraft decelerating runway which includes a depressible runway portion which will arrest the forward motion of an aircraft rolling onto the decelerating runway.

It is another object of this invention to provide a decelerating runway such as next above described that is constructed and arranged to be progressively depressed by the wheels of an aircraft in such a manner that the kinetic energy of the craft effectively will be absorbed to check the motion of the aircraft, while the lower or base portion of the runway upon which the depressible portion is disposed limits the depression of the upper portion and provides a stable support sustaining the weight of the aircraft and assuring that the aircraft will be maintained in the proper operative attitude while on the runway.

A further object is to provide a decelerating runway wherein a flexible cover forms the upper surface of the decelerating runway and with yieldable and displaceable or depressible means interposed between the cover and a substantially rigid base portion beneath the cover, makes it possible for the cover to be depressed in a manner quickly absorbing the kinetic energy of an aircraft, the depressible means between the cover and the base maintaining elevated at substantially the desired level, all of the cover except the area contacted by the aircraft wheels and the area immediately adjacent thereto, the entire cover returning to approximate runway level upon removing the aircraft from the decelerating runway.

Another object is to provide a decelerating runway which in one form includes a flexible and depressible cover overlying a predetermined amount of a gaseous fluid and a liquid confined in a basin between the cover and a substantially non-yieldable base portion of the basin, whereby the cover will be depressed and the liquid displaced by the wheels of an aircraft rolling thereon in a manner effectively absorbing the kinetic energy to check the motion of the aircraft. The amounts of the gaseous fluid and liquid are such that when an aircraft rolls onto the cover, the gaseous fluid will be compressed and the liquid displaced, the depression of the cover being in the area adjacent the wheels of the aircraft, thereby causing the kinetic energy to be absorbed with a comparatively short run of the aircraft. The flexible cover will bottom on the base portion which therefore limits the depression of the cover, provides a stable support to aid in sustaining the weight of the aircraft and assures that the aircraft will be maintained in the proper operative attitude while on the decelerating section. When the aircraft is run off the decelerating section the cover will be restored to the desired runway level by the hydrodynamic forces of the body of liquid and the action of the compressed gaseous fluid.

It is another object of this invention to provide a decelerating runway of the character described that is constructed, arranged and operable to facilitate quick removal therefrom of water or other foreign matter which may interfere with the kinetic energy absorbing action of the runway..

It is an additional object to provide a decelerating runway which in one form may include a body of resilient and elastic material which after being depressed by the aircraft wheels will return to runway level.

A further object is the provision of a decelerating runway which in one form may comprise a body or body sections of a frangible, depressible material which will be crushed by the landing gear wheels in a manner effectively absorbing the kinetic energy of an aircraft to bring the aircraft to a safe stop during a short run.

A further object is to provide a decelerating runway such as described which includes a basin extending the full width and length of the runway for containing a fluid enclosed by a flexible cover forming the surface of the runway, the depression of the cover by the aircraft wheels causing the fluid to be displaced and the cover to form a continuous sharply inclined surface ahead of the wheels whereby the kinetic energy will be quickly absorbed during a short run of the aircraft.

Another object is to provide a decelerating runway such as next above noted wherein the bottom or floor of the basin is gradually inclined from the start of the runway in a manner whereby the depth of depression of the cover is limited at the start of the runway, gradually becomes greater as the aircraft advances along the runway and then substantially levels off so as to prevent overloading of the landing gear and provide an even decelerating action in proportion to the speed of the aircraft and the length of travel of the aircraft on the cover.

A further object of this invention is the provision of a decelerating runway of the character next above described which, as a safety measure, may be provided adjacent the far end of the runway with a greater depth of the basin whereby an increased depth of depression of the upper surface of the runway will result in positive stopping of the rolling motion of the aircraft within the limits of the decelerating runway.

An additional object of this invention is to provide a decelerating runway of the character described which is constructed so that the upper surface or cover thereof may be transversely crowned when desired to facilitate runoff of water, as well as the removal of snow and other foreign matter.

Yet another object of this invention is the provision of a decelerating runway of the character described having a novel form of flexible cover constituting the upper surface of the runway, this cover being composed of flexible sheet material overlaid with a series of transversely spaced flexible, but inelastic, slat-like members running lengthwise of the cover. These members prevent longitudinal stretch of the flexible cover, but permit of limited transverse stretching of the cover. They also serve to prevent the landing gear wheels from damaging the cover as well as increase the coefficient of friction assuring effective absorption of the kinetic energy.

Another object is the provision of a decelerating runway having novel means for resiliently anchoring an end portion thereof to prevent rupture or damage of the cover and assure return thereof to desired runway level.

An additional object hereof is the provision of a decelerating runway of the character described in which the base or bottom thereof has portions inclined transversely of the runway in such a manner as to cause the wheels of aircraft landing gear rolling on such inclined portions on the runway to be urged towards the center of the runway.

Another object of this invention is the provision of a decelerating runway wherein the basin over which the flexible cover is extended contains an encapsulated body of liquid and a gaseous fluid so that the liquid is displaced upon depression of the cover, the encapsulation making it unnecessary to provide seals between the cover and the margins of the basin and also making it possible to inflate the encapsulated medium for the purpose of aerating the liquid, as well as for causing the upper surface to be raised so that it will be crowned transversely for the purposes hereinbefore noted.

Other objects and advantages of the invention will be hereinafter described or will become apparent to those skilled in the art, and the novel features of the invention will be defined in the appended claims.

Referring to the drawings.

This invention, as shown in the illustrative embodiments thereof in the accompanying drawings, comprises a decelerating runway 1 for aircraft, wherein a base portion generally designated 2 supports a depressible portion generally designated 3. The depressible portion is constructed and arranged so that the rolling wheels of an aircraft will depress it in a manner to absorb the kinetic energy of an aircraft and bring the aircraft to a safe stop during a comparatively short run thereof.

Figures 1, 2:
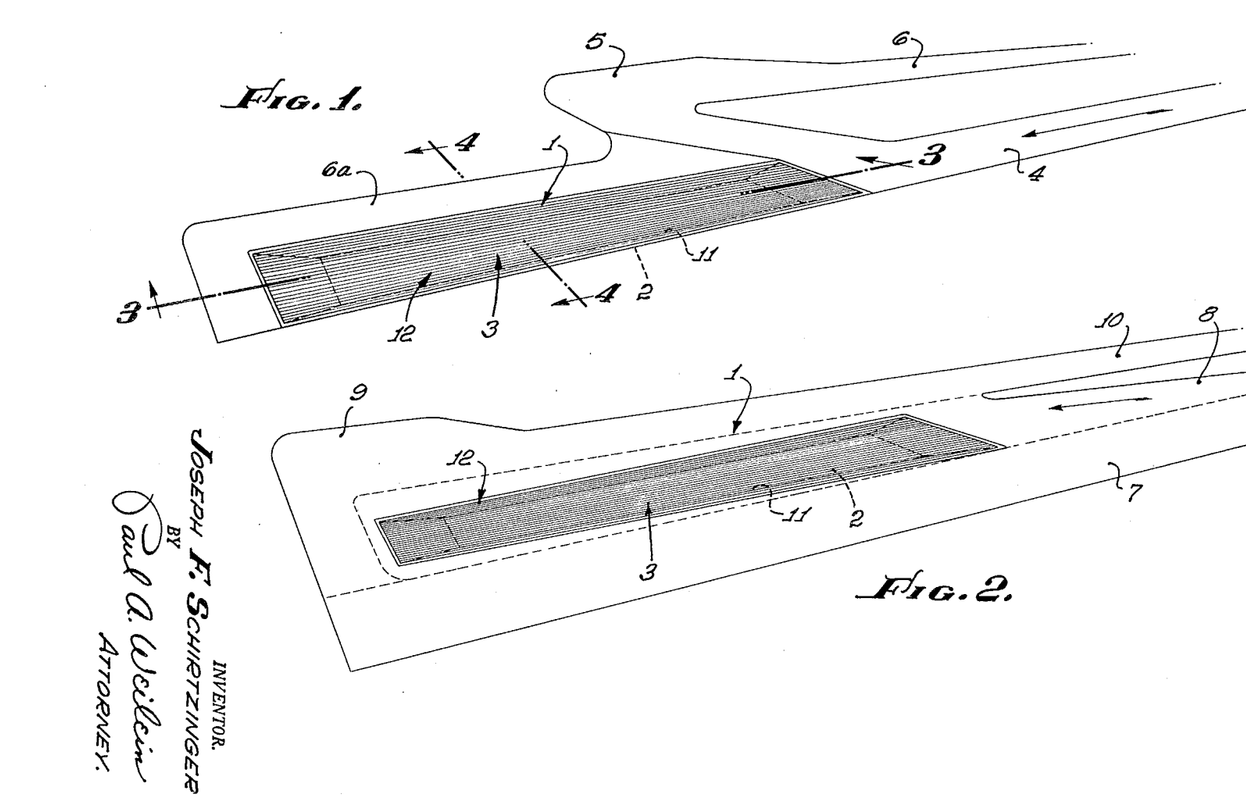
FIG. 1 is a schematic perspective view of a decelerating runway embodying the present invention, shown as an extension of a conventional aircraft runway.
FIG. 2 is a schematic longitudinal sectional view similar to FIG. 1 of a modified arrangement of the runway shown in FIG. 1.

One use of the decelerating runway 1 is shown in FIG. 1 where it is located at the outer end of a conventional hard-surfaced runway 4 either as an extension of the latter or as a reconstructed part thereof. Adjoining the conventional runway 4 and the decelerating runway 1 are a conventional holding apron 5 and a taxiing runway 6. As shown in FIG. 1, a taxiing runway 6a for use by aircraft removed from the decelerating runway 1 extends alongside the latter and adjoins the holding apron 5.

In a modified use of the decelerating runway 1 shown in FIG. 2, the runway 1 is disposed to one side of, but joined to, a conventional runway 7 adjacent the outer end of the latter, by means of a hard-surfaced approach runway section 8 angling off to one side of the conventional runway 7. This arrangement makes it possible for a rolling aircraft to be run off the conventional runway onto the decelerating runway and is well suited as an adjunct to a conventional runway in instances where there is no available overrun area at the end of a conventional runway. This modified arrangement also may include a holding apron 9 and the taxiing runway 10.

The decelerating runway 1 may be colored or otherwise given an appearance which will distinguish it from a conventional runway as an aid to a pilot seeking use of the decelerating runway.

It is important to note that due to a decelerating runway embodying this invention being capable of arresting a rolling aircraft and bringing it to a safe stop during a comparatively short run, such a runway may be of considerably less length than a hard-surfaced conventional runway which will safely bring an aircraft to a stop. It is estimated that a decelerating runway, in accordance with the invention, of the order of 1000 feet in length and, for example, 150 feet wide will be adequate safely to decelerate aircraft of all types including the larger, heavier jet-propelled types now in use and in process of development. It is obvious, however, that in some instances the length and width of the decelerating section may be varied as required, but that in all cases it may be of considerably less length than that of a hard-surfaced runway having comparable decelerating ability, and also may be produced at a lower cost than such a conventional runway.

As shown in FIGS. 3–15, a depressible decelerating runway embodying this invention includes an elongate basin structure 11, the bottom of which constitutes the aforementioned base portion 2 of the runway. This basin structure may be formed of concrete on suitably prepared ground so as to adjoin the conventional hard-surfaced runway as an integral part thereof, and serves as a support and confining means for the depressible runway portion 3.

In accordance with this invention, the depressible runway portion 3, as shown in FIGS. 1–14, may include a flexible cover 12 secured at its margins to the side walls 13 and end walls 14 of the basin structure 11 and yieldably supported between its margins by yieldable and depressible means 15 confined in the basin structure.

Figure 6:
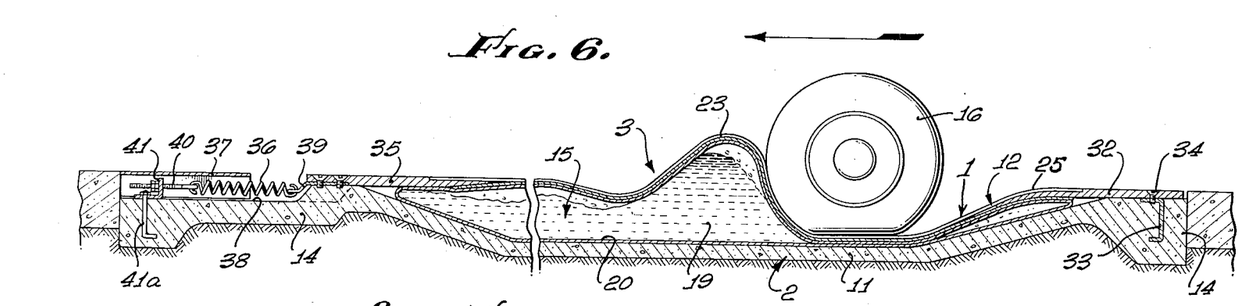
FIG. 6 is an enlarged fragmentary longitudinal sectional view showing how the upper portion of the runway is depressed by a rolling wheel of landing gear of an aircraft.
Figure 9:
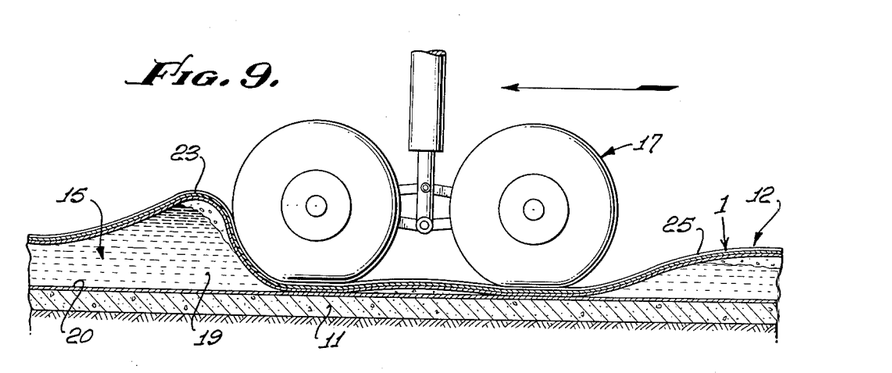
FIG. 9 is an enlarged fragmentary longitudinal sectional view similar to FIG. 6 showing how wheels of landing gear of a different type than shown in FIG. 6 will depress the flexible cover or upper portion of the runway.
Figure 10:
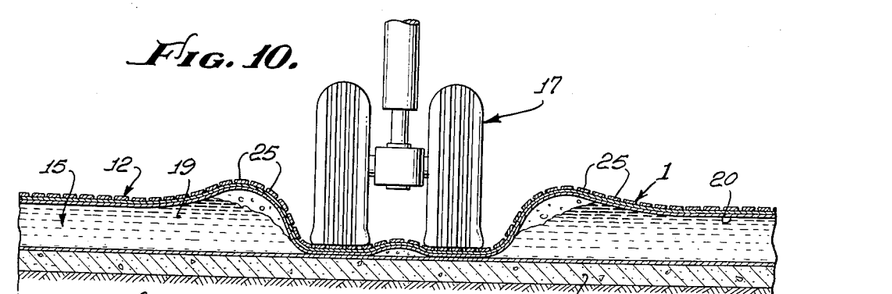
FIG. 10 is an enlarged fragmentary transverse sectional view showing how the landing gear wheels in FIG. 9 will depress the cover transversely.
Figure 11:
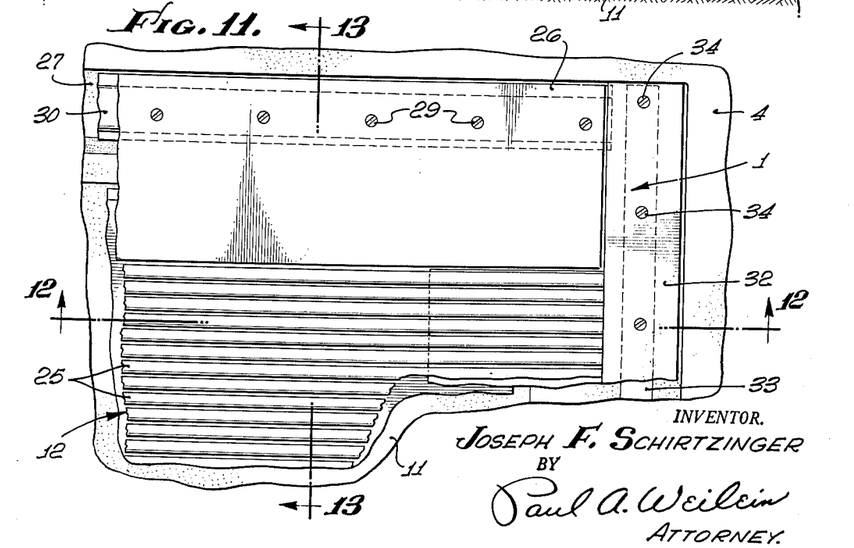
FIG. 11 is an enlarged fragmentary top plan view of a corner portion at the beginning of a decelerating runway.

The construction and relative arrangement of the basin structure 11, flexible cover 12 and depressible means 15 are such that the rolling landing gear wheels shown at 16 in FIG. 6, and the similar wheels shown at 17 in FIGS. 9 and 10, will depress the cover to the bottom of the basin 11 and thereby displace the yieldable depressible means 15 in a manner causing the kinetic energy of an aircraft to be progressively absorbed to effect the desired deceleration of the aircraft during a comparatively short run thereof.

The yieldable and depressible means 15, as shown in FIGS. 3–13, may be in the form of an encapsulated body of liquid, for example, a liquid which will resist freezing at low temperatures and is fire resistant. This body of liquid is generally designated 19 and the encapsulating means therefor is in the form of a flexible, fluid-tight bag 20. Any suitable means, not shown, may be used to introduce the liquid into the bag. The bag is confined in the basin structure 11 throughout the width and length of the latter and yieldable supports the cover 12.

The materials used for the cover and bag may be of any suitable strong and flexible, impervious and fireproof sheet material of sufficient strength and, if necessary, suitably reinforced to prevent damage or impairment thereof when the cover is encountered by the rolling wheels of an aircraft and the weight of the aircraft is yieldably borne by the cover and bag. The cover 12, for example, may be fabricated of nylon tire cord or canvas coated and/or impregnated with a suitable elastomer such as "neoprene" or any other suitable material that will provide in the cover the aforementioned characteristics. The bag 20, for example, may be made of polyvinyl chloride, polyethylene or other material which will provide the aforementioned desired qualities in the bag.

Figure 4:
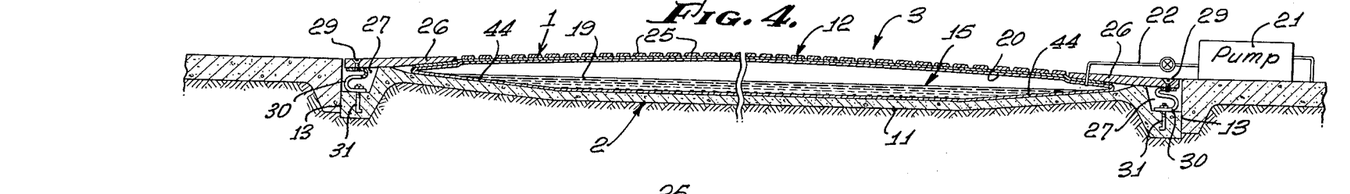
FIG. 4 is a fragmentary enlarged transverse sectional view taken on the line 4—4 of FIG. 1.
Figure 5:
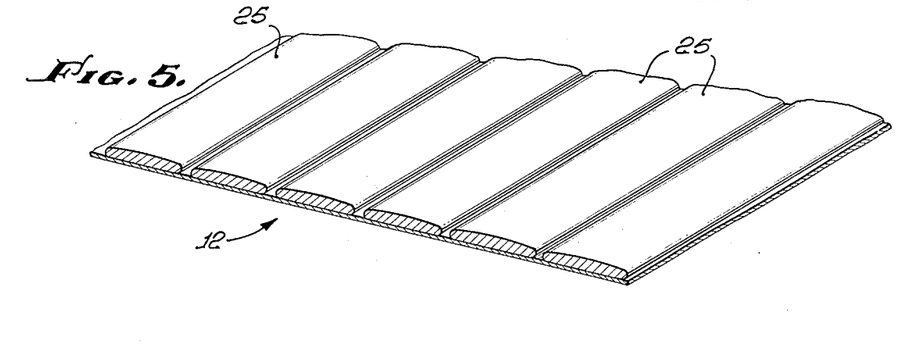
FIG. 5 is an enlarged fragmentary perspective view of a portion of a flexible cover forming the upper surface of the runway.

Any suitable means may be employed to introduce gaseous fluid, for example, air, into the bag 20. One such means is schematically illustrated in FIG. 4 and comprises a pump unit 21 having a suitably valved line 22 communicating with the interior of the bag 20. The pump unit 21 makes it possible to inflate the bag 20 in such a manner that the cover 12 will be given a convex form or crowned transversely of the decelerating runway to facilitate runoff of rain and the removal of snow, ice and other foreign matter from the cover. Moreover, the pump unit or one similar thereto could be used for introducing the liquid into the bag.

It is preferable that a space be provided between the top of the liquid and the top of the bag for air or other gas and to permit of displacement of the liquid without rupturing the bag. The liquid will in time, due to agitation, become aerated and therefore somewhat compressible, but the presence of gas and liquid, whether separated or emulsified, will permit of required displacement of the liquid.

Before describing the details of construction of the cover 12 and the manner in which it may be anchored at its margins to the walls of the basin structure 11, and before describing the details of the formation of the basin structure, it should be noted that as shown in FIGS. 6, 9 and 10, the wheels 16 and 17 of the aircraft will depress the cover 12 and displace the fluid 19 in the bag 20 as indicated in those figures, so that a "bow wave" effect is created by the rolling wheels. This "bow wave" effect is indicated at 23 in FIGS. 6 and 9. Fig. 10 shows how the cover and liquid are laterally displaced by the wheels. Progressive displacement of the fluid beneath the cover 12 in the manner indicated in FIGS. 6, 9 and 10, progressively absorbs the kinetic energy of the aircraft during a very short run of the aircraft on the decelerating section and there is presented a sharply inclined "uphill" surface yieldably resisting advance of the wheels as the latter roll along the cover while the cover is depressed against the bottom of the basin 11 beneath the wheels. In other words, the kinetic energy of the aircraft is dissipated or employed to progressively displace the fluid contained in the decelerating strip. It will be appreciated that literally tons of liquid must be so displaced as an aircraft traverses a relatively short decelerating strip made in accordance with the invention.

The hydrostatic force of the liquid and the force of the air compressed in the bag 20 will cause the bag and the cover 12 to assume normal positions with the cover at substantially the level of the adjacent conventional runway after the aircraft wheels have passed given points along the cover.

It is desired that the flexible cover 12 be safeguarded against rupture or other impairment under the loads and stresses to which it is subjected. It is also desired that the cover provide an effective braking surface for the aircraft wheels and that it be substantially non-stretchable longitudinally, but capable of limited stretching transversely. For these purposes, as shown in FIGS. 3, 4, 5 and 11, a plurality of flexible and preferably relatively inelastic reinforcing strips 25 are bonded or otherwise securely united with the cover so as to extend in close laterally spaced relation to one another longitudinally of the upper surface of the cover. These strips may be made of a suitable plastic or a plastic and fiberglass composition or any other suitable material, provided that they will have high tensile strength, are flexible and tough and will serve the aforementioned purposes. Due to the close lateral spacing of the strips 25, the tires on the aircraft wheels will not come in contact with the cover 12 proper.

Figure 13:
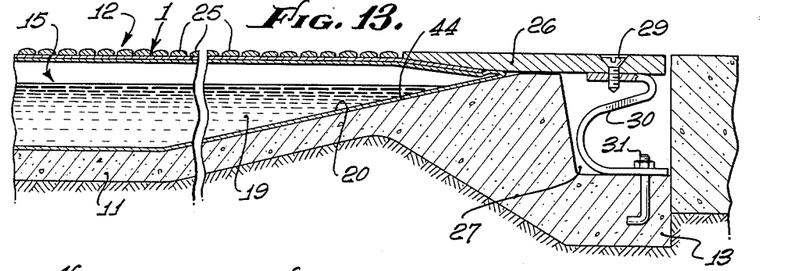
FIG. 13 is an enlarged fragmentary transverse sectional view taken on the line 13—13 of FIG. 11.

It is to be understood that any suitable means may be employed to secure the margins of the cover 12 to the walls of the basin 11. As shown in FIGS. 4 and 13, the longitudinal side edges of the cover 12 may be resiliently anchored to the side walls 13 of the basin 11. This may be accomplished with the aid of relatively thick, strong and elongated anchoring plates 26 bonded or otherwise securely joined to the side edges of the cover. The plates 26 are slidably supported on the upper portions of the side walls 13 and, in part, overlie recesses 27 in the side walls. These overlying portions of the plates 26 are secured by fastenings 29 to the upper ends of resilient anchoring members 30 mounted in the recesses 27 with their lower ends bolted as at 31 to the side walls 13. These anchor members as here shown, may be made in the form of reversed S-shaped leaf springs which will permit limited transverse yielding of the cover 12 when the latter is depressed.

Figure 3:
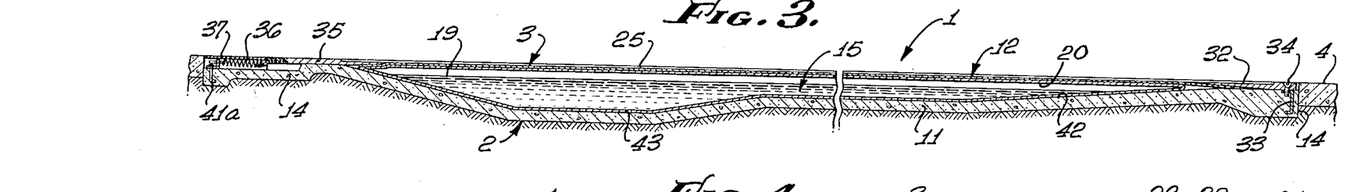
FIG. 3 is a fragmentary enlarged longitudinal sectional view taken on the line 3—3 of FIG. 1.
Figure 12:
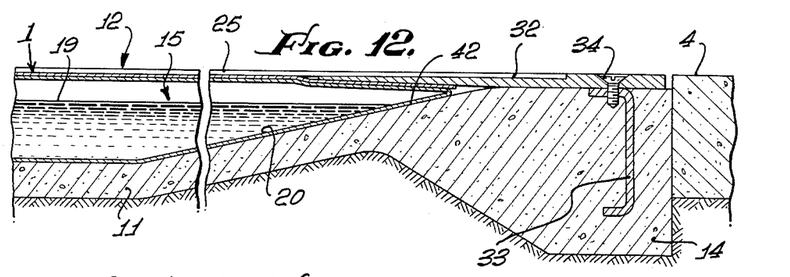
FIG. 12 is an enlarged fragmentary longitudinal sectional view taken on the line 12—12 of FIG. 11.

The end edge of the cover 12 at the beginning of the decelerating runway may be secured in any suitable manner to the adjacent part of the conventional runway with which the decelerating runway is joined. As shown in FIGS. 3, 6 and 12, this end of the cover may be secured by the aid of an anchoring plate 32 which is bonded or otherwise securely joined to the cover and rests upon the adjacent end wall 14 of the basin 11, particularly as shown in FIG. 12. The plate 32 may be securely anchored to the end wall by means of anchoring members 33 embedded in the wall 14 and secured to the plate 32 by means of fastenings 34. With this arrangement, it is seen that the wheels of the landing gear of an aircraft may roll off of the conventional runway onto the plate 32 which in fact is a part of the cover 12 or decelerating runway. In this connection, it should be noted that the reinforcing strips 25 are bonded or otherwise securely fastened on the upper side of the plate 32, as shown in FIG. 12.

Figure 7:
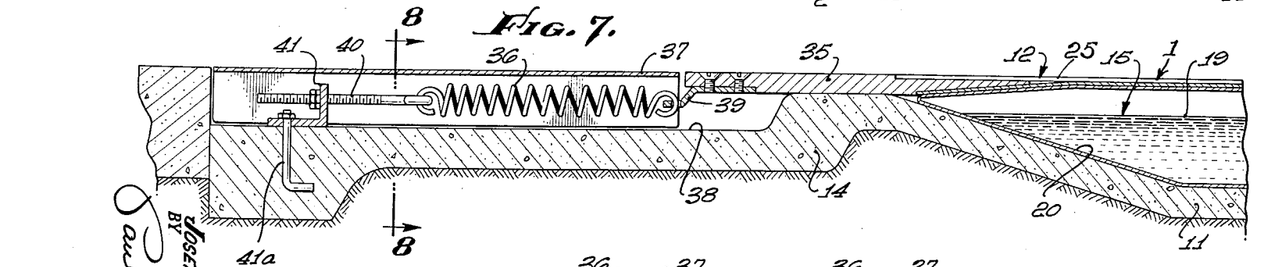
FIG. 7 is a further enlarged fragmentary sectional view of the portion of the runway shown at the left end of FIG. 6, illustrating resilient anchoring means for an end of the flexible cover or upper portion of the runway.
Figure 8:
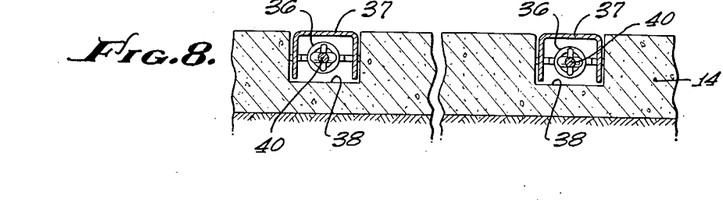
FIG. 8 is a fragmentary transverse sectional view taken on the line 8—8 of FIG. 7.

Means are provided for anchoring the far end of the cover 12 to the far end of the basin 11. As shown in FIGS. 6 and 7, the means may include an anchoring plate 35 which is bonded or otherwise securely fastened to the cover 12 as well as to the adjacent ends of the reinforcing strips, and slidably rests upon the adjacent end wall formation 14 of the basin 11. This anchoring means may also include a suitable number of retractile springs 36 mounted in housings 37 seated in recesses 38 in the end wall formation 14 arranged to place portions of the cover 12 under tension by being connected with the anchoring plate 35 and the wall formation 14. Brackets 39 connect the springs 36 with the plate 35, whereas adjustable screws 40 mounted in brackets 41 fixed by fastenings 41a to the end wall formation 14 anchor the springs to this wall formation. The springs 36 normally apply a tensioning force to the cover and the screws 40 may be adjusted to vary the force of the springs. Should the rolling wheels of an aircraft travel adjacent the far end of the cover 12, the springs 36 will maintain the cover under a tension that will reduce bunching of the cover at the far end thereof.

The springs 36, however, do not prevent the "bow wave" effect previously referred to and which is illustrated in FIGS. 9 and 6, as this effect is an important factor in bringing about a quick and safe deceleration of the aircraft. If desired, other margins of the cover may be secured in place by anchoring means such as shown in FIGS. 6 and 7.

Provision is also made in accordance with this invention for controlling the depression of the flexible cover 12 so that the latter will be gradually depressed as the wheels of the landing gear of an aircraft roll onto the beginning of the decelerating runway. It is desired that the rate of depression be so gradual as to avoid imposing upon the landing gear a load that would tend to damage it and at the same time prevent the aircraft from assuming a dangerous attitude upon leaving the conventional hard-surfaced runway. It is also essential that the depth of the basin throughout at least the major portion thereof be such that the depression of the cover will be controlled to prevent undue loading of the landing gear and dangerous attitudes of the aircraft. Accordingly, as shown in FIGS. 3, 6 and 12, the bottom of the basin may be gradually sloped as at 42 from the entrance of the decelerating runway to a maximum uniform and predetermined depth throughout the remainder of the runway. For example, a depth of between 12 and 15 inches would be satisfactory in the case of present-day aircraft, although this depth may vary depending upon the necessity for accomplishing the desired decelerating action without imposing undue loads on the landing gear and preventing the aircraft from assuming undesirable attitudes while rolling on the decelerating section.

It may be desired, as shown in FIG. 3, to provide a deep portion 43 of the basin at the far end of the decelerating runway as a safeguard. This deep portion will cause a pronouncedly increased decelerating action which positively will prevent overrunning of the decelerating runway.

Means also may be provided in the decelerating runway for assuring that an aircraft rolling thereon adjacent longitudinal side margins thereof, will be urged toward the center of the runway. For this purpose the bottom of the basin 11 along the sides thereof may be inclined somewhat as indicated at 44 in FIGS. 4 and 13 as a guiding means. With this arrangement aircraft are prevented from rolling off of the sides of the decelerating runway, as well as from assuming attitudes that may prove dangerous.

For purposes of economy as to material and construction costs, as well as to the amount of ground utilized, the decelerating runway may be tapered so that it is gradually reduced in width as indicated in FIG. 2.

Figure 14:
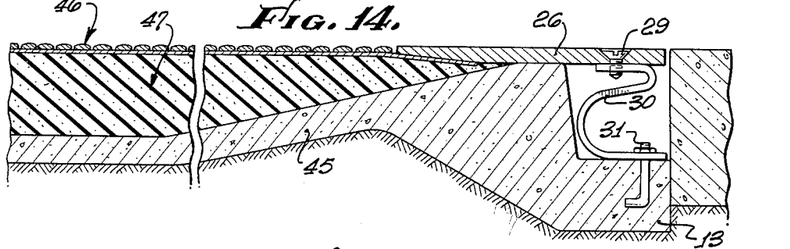
FIG. 14 is an enlarged fragmentary transverse sectional view similar to FIG. 13, of a modified form of this invention.

A modified form of this invention, as illustrated in FIG. 14, may consist of a basin structure 45 corresponding to the basin structure 2, a flexible cover 46 corresponding to the flexible cover 12 and a body 47 of an elastic, compressible material, for example, in the nature of sponge rubber or its equivalent. The body 47 is confined in the basin 45 beneath the flexible cover 46 in the same manner as in the previously described form of the invention, except that no bag like the bag 20 need be used. In all other respects, this form of the invention corresponds to the previously described form. Accordingly, those parts of the runway shown in FIG. 14 which correspond to the parts of the previously described form of the invention are designated by the same reference characters.

Figure 15:
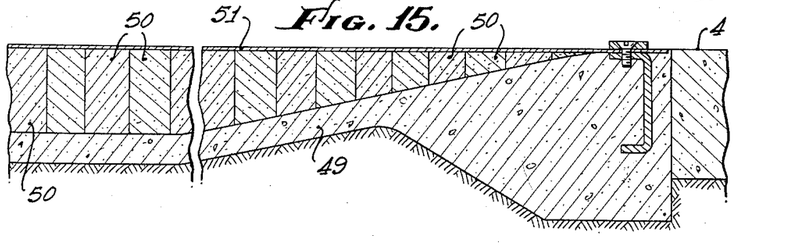
FIG. 15 is a view similar to FIG. 14 of another modified form of the invention.

In another modified form of this invention as shown in FIG. 15, the runway section may comprise a basin-like structure 49 corresponding to the basin 11 for containing a series of slabs or blocks 50 of depressible, crushable material. A cover for these blocks or slabs need not be used, but if desired, a flexible cover 51 may be provided over the blocks or slabs and may be secured in place in any suitable manner. Such a cover will prevent water and foreign matter from being absorbed by or getting between the blocks and may, if desired, be of a nature such that it will be destroyed by the wheels of the aircraft rolling onto the decelerating section. The depressible, crushable blocks or slabs 50 will likewise be destroyed and with the cover, may be replaced. This replacement readily may be effected in view of the block or slab formation of the depressible material. Any number of materials may be used for forming the depressible, crushable blocks. Preferably, however, the material should be inert and cellular with the cells closed, but these qualities need not be present. Certain expanded polystyrenes and a foam glass product known as "Foamsil" or the equivalent thereof, are suitable. It is desired that the blocks or slabs will have a density of approximately 5 to 10 pounds per cubic foot and a field strength of between 100 and 125 pounds per square inch, as well as a shear strength of approximately 60–80 pounds per square inch, although these factors may be varied. It is also desired that the material use will be non-absorptive, fire resistant, non-toxic, resistant to erosion and chemical attack and will have an environmental adaptability to retain physical properties under various climatic conditions.

In being crushed by the aircraft wheels the blocks or slabs 50, as shown in FIG. 14, will produce a coefficient of friction such that the kinetic energy of an aircraft will be absorbed and the aircraft brought to a safe stop during the comparatively short run of the aircraft.

With reference to the foregoing description and accompanying drawings, it will be apparent that as the rolling wheels of an aircraft traverse a decelerating runway embodying this invention, there is formed progressively in front of the wheels an upright or upwardly inclined portion of the runway which is progressively depressed, displaced, or crushed by the wheels in a manner effectively absorbing kinetic energy so as to bring the aircraft safely to a stop. Thus, this invention provides a new and advantageous method of preventing overrunning of a runway as well as a new and advantageous aircraft runway construction.

After an aircraft has been brought to a stop on a decelerating runway embodying the present invention, it may be run off the runway from either side or at the far end of the runway where the bottom of the basin structure may be sloped gradually similarly to the slope at the entrance end of the runway. The sloping portions of the bottom of the basin structure along the sides of the runway facilitate removal of the aircraft over the sides of the runway 1.

While specific structural details have been shown and described, it should be understood that changes and alterations may be resorted to without departing from the spirit of the invention as defined in the appended claims. Moreover, it should be understood that each of the various energy absorbing materials referred to above is "depressible," fluid such as a liquid being displaced upon depression, gas being displaced and/or compressed upon depression, sponge rubber or the like also being displaced and/or compressed, and the frangible material being crushed upon depression.

I claim:

1. An aircraft runway including: a runway for the landing and take-off of an aircraft; a decelerating runway disposed so that an aircraft may roll thereon from said landing and take-off runway; said decelerating runway comprising a base; a flexible cover mounted over said base in a position to be depressed against said base by the rolling wheels of an aircraft; and fluid interposed between said base and said cover displaceable in response to said depression of said cover.

2. An aircraft runway including: a base; a cover mounted over said base in a position to be depressed against said base by the rolling wheels of an aircraft; and yieldable means including a body of liquid confined between said base and said cover in an amount so as to be displaceable in response to said depression of said cover.

3. An aircraft runway including: a base; and means confining on said base a body of liquid in a manner whereby the liquid is displaceable while so confined when said confining means is depressed against said base by the wheels of a rolling aircraft, to absorb the kinetic energy of said aircraft.

4. An aircraft runway including: a base; a flexible cover mounted over said base in a position to be depressed onto said base by the rolling wheels of an aircraft; and means cooperable with said base and said cover for confining between said base and said cover an amount of gas and liquid that will be displaceable in response to said depression of said cover and permit said base to sustain the weight of the aircraft rolling on the cover.

5. An aircraft runway including: a base; a flexible cover mounted over said base in position to be depressed onto said base progressively by the force of the rolling wheels of an aircraft; means cooperable with said base to form a basin; and a body of fluid displaceable in said basin in response to depression of said cover.

6. An aircraft runway including: a basin structure; a flexible cover mounted over said basin structure in position to be depressed progressively onto the bottom of said basin by the force of the rolling wheels of an aircraft; and a body of liquid within said basin beneath said cover.

7. An aircraft runway including: a basin structure; a flexible cover; means securing margins of said cover to marginal portions of said basin structure with said cover in position to be depressed progressively between its margins onto the bottom of said basin by the force of the rolling wheels on an aircraft; and a body of gas and liquid enclosed in said basin and supporting the portions of said cover between the margins of the cover.

8. An aircraft runway comprising: a longitudinally extended base; and covered depressible means on said base providing a surface cooperable with said base for absorbing the kinetic energy of an aircraft upon depression by the landing gear wheels of said aircraft rolling thereon; said depressible means including liquid confined between said surface and said base and being of varying depth along said base from the entrance end of the runway to vary the kinetic energy absorbing action of said depressible means.

9. An aircraft runway comprising: a longitudinally extended base; depressible means on said base for absorbing the kinetic energy of an aircraft upon depression by the landing gear wheels of said aircraft; said base having sloping side portions, said depressible means being of varying depth transversely of said base and including a cover depressible against said base; and means between said cover and base confining a body of liquid in an amount so as to be displaceable upon said depression of said cover.

10. An aircraft runway comprising: a longitudinally extended base; and depressible means on said base; means cooperating with said base for enclosing said depressible means as well as for absorbing the kinetic energy of an aircraft upon depression against said base by the landing gear wheels of said aircraft; said depressible means including a liquid on said base and a flexible cover supported over said base in position to be depressed against said liquid by said wheels; said liquid gradually increasing in depth from the entrance end of said runway to gradually increase the kinetic energy absorbing action of said depressible means.

11. An aircraft runway comprising: a base; yieldable, displaceable means on said base; a flexible cover; said displaceable means including means for confining between said base and said cover a body of liquid in a position to be engaged by said cover; and resilient means yieldably connecting margins of said cover to margins of said base to support said cover in position to be depressed onto said base by the wheels of a rolling aircraft in a manner displacing said displaceable means.

12. An aircraft runway comprising: an elongate base; depressible means on said base including a body of liquid; an elongate, flexible cover overlying said base; means cooperable with said cover and base for confining said body of liquid beneath and in spaced relation to said cover and means yieldably anchoring an end portion of said cover to one end of said base; said cover being disposed so that it will be depressed against said base in a manner displacing said body of liquid when engaged by the landing gear wheels of a rolling aircraft.

13. A runway comprising: a runway section for the landing and take-off of aircraft; an elongate decelerating runway adjoining said runway section including depressible material having a surface which when the rolling wheels of an aircraft pass thereover will be progressively depressed an extent equal to the depth of said material to absorb the kinetic energy of said aircraft; a base supporting said material and operable to support the weight of an aircraft rolling over said material; said depressible material gradually increasing in depth from the entrance of said runway for a portion of the length thereof and thereafter being of substantially uniform depth for a portion of the length thereof.

14. A runway comprising: a runway section for the take-off and landing of aircraft; a decelerating runway adjoining said section including an elongate basin; depressible material filling said basin and provided with a surface which when the rolling wheels of an aircraft pass thereover will be progressively depressed against the bottom of said basin to displace said material and thereby absorb the knetic energy of said aircraft, the depth of said basin structure determining the extent of depression of said surface; said basin structure being gradually increased in depth from the extrance end of the runway a predetermined extent along the length thereof.

15. In an aircraft runway: an elongate, depressible runway section arranged to be depressed by the wheels of a rolling aircraft; said section including an elongate, depressible enclosure including a depressible upper member, non-depressible side members and a non-depressible bottom member; said enclosure confining therein fluid displaceable in response to said depression of said upper member against said bottom member.

16. In an aircraft runway: an elongate, depressible enclosure having a depressible upper member and a non-depressible bottom member; said enclosure confining therein fluid displaceable upon depression of said upper member against said bottom member; and means overlying said enclosure operable to depress said upper member against said bottom member when engaged by the wheels of a rolling aircraft.

17. In an aircraft runway: an elongate, flexible, depressible and inflatable enclosure confining therein an amount of liquid which is displaced upon depression of the enclosure; base means for supporting the weight of an aircraft on said enclosure; means overlying said enclosure operable to depress said enclosure against said base means when engaged by the wheels of a rolling aircraft; and means providing for inflation of said enclosure with a fluid.

18. A runway constructed and arranged to provide a section for the take-off and landing of aircraft; and a decelerating section portion joined to said runway so that an aircraft may roll from said section onto said decelerating runway portion; said decelerating runway portion being characterized by elongate, depressible means engageable by the wheels of rolling aircraft thereon for absorbing kinetic energy of said aircraft.

19. In combination: a first runway for the take-off and landing of aircraft; a second runway disposed so that a rolling aircraft may be rolled thereon from said first runway; said second runway including therealong depressible means engageable by the wheels of the aircraft for absorbing kinetic energy of said aircraft.

20. A runway construction for aircraft comprising: a hard-surfaced runway for the take-off and landing of aircraft; and a decelerating runway adjoining a side of said hard-surfaced runway; said decelerating runway including a body of depressible material for absorbing kinetic energy of said aircraft upon depression by the wheels of the landing gear of said aircraft.

21. A runway for the landing and take-off of aircraft including a runway disposed for decelerating an aircraft rolling thereon from said landing and take-off runway; said decelerating runway comprising: a base; and a body of elastic, depressible material on said base for absorbing kinetic energy of said aircraft upon depression against said base by the wheels of the landing gear of an aircraft an extent such that the base supports the weight of the aircraft.

22. A runway for landing and take-off of aircraft including a runway for decelerating aircraft rolling thereon from said landing and take-off runway; said decelerating runway being adjacent said landing and take-off runway and comprising: a body of elastic, depressible material; a non-yieldable base underlying said body for supporting the weight of an aircraft; and a flexible cover overlying said material and providing a surface onto which the wheels of a rolling aircraft may be directed for depressing said cover against said non-yieldable base to absorb kinetic energy of said aircraft.

23. A runway for decelerating a rolling aircraft comprising: a body of frangible material for absorbing kinetic energy of said wheels upon being crushed by the landing gear wheels of an aircraft.

24. A runway for decelerating a rolling aircraft comprising: a body of inert crushable material extending along the runway; and a flexible cover overlying said body; said cover and body being depressible by the rolling wheels of an aircraft for progressively crushing said body.

25. A runway for airplanes comprising: a hard surfaced runway section providing for the take-off and landing of airplanes; a decelerating runway section adjoining said hard surfaced section in a position such that a pilot during take-off from the hard surfaced runway section or on landing thereon optionally may direct the airplane onto said decelerating runway section; said decelerating runway section comprising an elongate base; and means providing a depressible elongate runway portion overlying said base and presenting a surface on which the landing gear wheels of an aircraft may roll so as to progressively depress said depressible runway portion against said base with the latter sustaining the weight of the airplane while said progressive depression absorbs the kinetic energy of the rolling airplane.

26. A runway for airplanes comprising: a hard surfaced runway section providing for the take-off and landing of airplanes; a decelerating runway section adjoining said hard surfaced section in a position such that a pilot during take-off from the hard surfaced runway section or on landing thereon optionally may direct the airplane onto said decelerating runway section; said decelerating runway section comprising an elongate base; a flexible bag supported on said base and confining therein a body of liquid; and a flexible cover mounted over said bag and providing a surface on which the wheels of the airplane will roll and progressively depress said cover and said bag against said base and thereby progressively displace said liquid to absorb kinetic energy of the rolling airplane while the weight of the rolling aircraft is sustained by said base.

References Cited in the file of this patent

UNITED STATES PATENTS

| | | |
|---|---|---|
| 1,739,193 | Ward | Dec. 10, 1929 |
| 2,466,150 | Burt | Apr. 5, 1949 |
| 2,728,539 | Morrill | Dec. 27, 1955 |

FOREIGN PATENTS

| | | |
|---|---|---|
| 741,920 | Great Britain | Dec. 14, 1955 |
| 742,240 | Great Britain | Dec. 21, 1955 |